United States Patent
Takuma

(10) Patent No.: US 10,885,121 B2
(45) Date of Patent: Jan. 5, 2021

(54) FAST FILTERING FOR SIMILARITY SEARCHES ON INDEXED DATA

(71) Applicant: INTERNATIONAL BUSINESS MACHINES CORPORATION, Armonk, NY (US)

(72) Inventor: Daisuke Takuma, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 367 days.

(21) Appl. No.: 15/840,670

(22) Filed: Dec. 13, 2017

(65) Prior Publication Data
US 2019/0179910 A1 Jun. 13, 2019

(51) Int. Cl.
*G06F 16/00* (2019.01)
*G06F 16/93* (2019.01)
(Continued)

(52) U.S. Cl.
CPC .......... *G06F 16/93* (2019.01); *G06F 16/2237* (2019.01); *G06F 16/248* (2019.01); *G06F 16/24578* (2019.01); *G06F 16/41* (2019.01)

(58) Field of Classification Search
CPC .... G06F 16/435; G06F 16/434; G06F 16/438; G06F 16/9535; G06F 16/00; G06F 17/30; G06F 17/30752; G06F 17/30277; G06F 11/1474; G06F 11/1662; G06F 11/1469; G06F 16/9024; G06F 17/30029; G06F 17/3005; G06F 17/30867; G06F 19/00; G06F 12/16; G06F 17/30958; G06F 2201/385; G06F 9/466; G06F 11/1084; G06F 11/0727; G06F 11/0778; G06F 11/3006; G06F 21/6227; G06F 16/58; G06F 17/271; G06F 17/21; G06F 17/27; G06F 17/30082; G06F 17/30008; G06F 17/30286; G06F 16/93; G06F 16/41; G06F 16/248;
(Continued)

(56) References Cited

U.S. PATENT DOCUMENTS 4,290,084 A * 9/1981 Minshull ................. G06K 9/54
358/451
6,675,159 B1 * 1/2004 Lin ........................ G06F 40/253
(Continued)

OTHER PUBLICATIONS

Makoto Nakamura et al., Development of the eLen Regulation Database to Support Legislation of Municipalities, Legal Knowledge and Information Systems, URIX 2014: The Twenty-Seventh Annual Conference, Jagiellonian University, Krakow, Poland, Dec. 2014.
(Continued)

*Primary Examiner* — Anh Ly
(74) *Attorney, Agent, or Firm* — Tutunjian & Bitetto, P.C.; Randall Bluestone

(57) ABSTRACT

Methods and systems for searching for similar documents include comparing an input index of a requested document to one or more stored indices for respective stored documents to produce a similarity score for each of the stored documents. Each index indicates which of a plurality of queries matched a respective document. The stored documents are filtered to remove dissimilar documents based on a comparison of each respective similarity score to a threshold. A list of any stored documents that remain after said filtering is output.

13 Claims, 4 Drawing Sheets

(51) Int. Cl.
*G06F 16/248* (2019.01)
*G06F 16/22* (2019.01)
*G06F 16/2457* (2019.01)
*G06F 16/41* (2019.01)

(58) Field of Classification Search
CPC ........... G06F 16/2237; G06F 16/24578; G06F 16/262; H04L 12/16; H04L 43/12; H04L 67/10; G06Q 30/201
See application file for complete search history.

(56) References Cited

U.S. PATENT DOCUMENTS

| | | | |
|---|---|---|---|
| 6,772,141 B1* | 8/2004 | Pratt | G06F 16/334 |
| 8,140,505 B1 | 3/2012 | Jain et al. | |
| 8,185,532 B2 | 5/2012 | Tsai et al. | |
| 8,868,543 B1* | 10/2014 | Henzinger | G06F 16/951 707/713 |
| 9,319,221 B1* | 4/2016 | Awad | H04L 9/3231 |
| 2004/0064442 A1* | 4/2004 | Popovitch | G06F 16/951 |
| 2006/0173556 A1* | 8/2006 | Rosenberg | G06F 16/9535 700/3 |
| 2006/0242098 A1* | 10/2006 | Wnek | G06F 16/33 706/45 |
| 2007/0073678 A1* | 3/2007 | Scott | G06F 16/374 |
| 2010/0318538 A1* | 12/2010 | Wyman | G06F 16/3349 707/759 |
| 2011/0137912 A1* | 6/2011 | Ragusa | G06F 16/313 707/741 |
| 2012/0123854 A1 | 5/2012 | Anderson et al. | |
| 2012/0166425 A1* | 6/2012 | Sharma | G06F 16/338 707/722 |
| 2012/0278341 A1* | 11/2012 | ogilvy | G06F 16/313 707/749 |
| 2014/0177951 A1* | 6/2014 | Biffar | G06K 9/6254 382/161 |
| 2014/0358518 A1* | 12/2014 | Wu | G06F 40/58 704/3 |
| 2016/0048934 A1* | 2/2016 | Gross | G06Q 30/0276 705/313 |
| 2017/0091239 A1 | 3/2017 | Bumbulis | |
| 2017/0235788 A1* | 8/2017 | Borisyuk | G06Q 50/01 707/723 |
| 2017/0286544 A1* | 10/2017 | Hunt | G06F 16/958 |
| 2017/0300235 A1* | 10/2017 | Maeda | G06F 3/0641 |

OTHER PUBLICATIONS

Jingdong Wang, Hashing for Similarity Search: A Survey, Computer Science, Data Structures and Algorithms, Aug. 2014.

Ella Bingham, Random projection in dimensionality reduction : Applications to image and text data, Proceedings of the seventh ACM SIGKDD international conference on Knowledge discovery and data mining, KDD Aug. 2001 San Francisco, CA.

Felix X. Yu et al., Circulant Binary Embedding, Proceedings of the 31 st International Conference on Machine Learning, Beijing, China, May 2014.

* cited by examiner

FAST FILTERING FOR SIMILARITY SEARCHES ON INDEXED DATA

BACKGROUND

Technical Field

The present invention generally relates to searching indexed data and, more particularly, to filtering for similar documents.

Description of the Related Art

Finding the similarity between texts in a large body of documents can be computationally expensive. For example, although the edit distance (also known as the Levenshtein distance) between two texts provides a good measure of similarity between two texts, it is very time consuming to compute the edit distance between a given text and each text in a database.

Other approaches for filtering out dissimilar texts include performing locality-sensitive hashing, calculating a Min-Hash for sets of n-grams for each text, and linear methods such as random projection and binary embedding. However, these solutions are all inefficient in their own right and cannot provide practical similarity matching.

SUMMARY

A method for searching for similar documents includes comparing an input index of a requested document to one or more stored indices for respective stored documents to produce a similarity score for each of the stored documents. Each index indicates which of a plurality of queries matched a respective document. The stored documents are filtered to remove dissimilar documents based on a comparison of each respective similarity score to a threshold. A list of any stored documents that remain after said filtering is output.

A method for searching for similar documents includes generating a respective stored index for each of a set of stored documents based on a plurality of queries. Each query includes one or more patterns of data. The input index records which queries match the input document. An input index is generated for a requested document based on the plurality of queries. An input index of the requested document is compared to one or more stored indices for respective stored documents to produce a similarity score for each of the stored documents by performing an XOR operation between the input index and each stored index and counting a number of '1' bits in an output of each XOR operation. Each index indicates which of a plurality of queries matched a respective document. The stored documents are filtered to remove dissimilar documents based on a comparison of each respective similarity score to a threshold. A list of any stored documents that remain after said filtering is output.

A system for searching for similar documents includes a user interface configured to receive a requested document and to display similar documents. A database is configured to store a set of documents and a respective index for each stored document. Each index indicates which of a set of queries matched a respective document. A similarity module having a processor is configured to compare an input index of the requested document to one or more stored indices for respective stored documents. A search module is configured to filter the stored documents to remove dissimilar documents based on a comparison of each respective similarity score to a threshold and to output a list of any stored documents that remain after said filtering for display as the similar documents.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention create an index of a body of documents based on word-based queries. Each word-based query include a set of one or more words, and matching any word in a query to a document means that the query is satisfied for that document. An index for each document is then built based on which queries are satisfied for the document. When a new document is introduced for similarity matching, an index is built for the new document based on the same queries. That index is then efficiently compared with the existing document indices. A score is generated and, if that score exceeds a threshold, the new document is discarded as being too dissimilar.

The present embodiments find one particular application in the comparison of, for example, legal documents across local governments. Such documents can be quite lengthy and difficult to manually index. Furthermore, each local government will have its own way of organizing information, making it difficult to automatically search ordinances and codes for needed information. However, because such provisions often use very similar language (sometimes directly copied from an exemplar with particular values being changed to fit local needs), an efficient way to find similar documents in the body of text would aid in searching through local ordinances to find provisions of interest.

Figure 1:
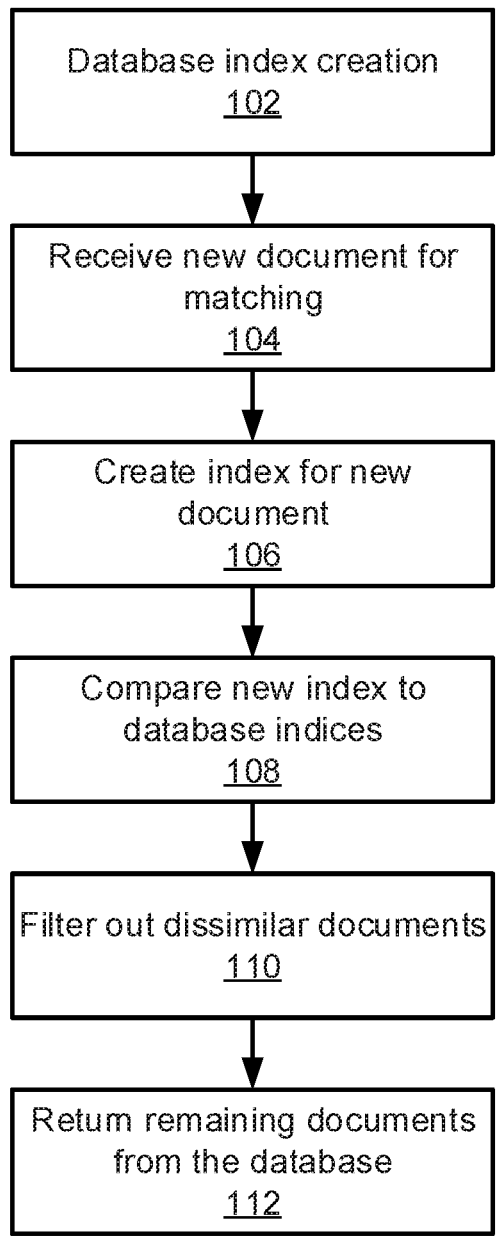
FIG. 1 is a block/flow diagram of a method of searching for documents that are similar to a given input document in accordance with an embodiment of the present invention.

Referring now to FIG. 1, a method for fast filtering of similar documents is shown. Block 102 creates indices for a set of documents in a database. Although the present description focuses specifically on the use of text documents, it should be understood that the present principles may be applied to different forms of data as well, such as audio data, image or video data, binary data, etc. Particular embodiments for index generation will be described in greater detail below.

Block 104 then receives a new document and block 106 creates an index for the new document using the same process as is used to generate the database indices. Block 108 compares the new index to the database indices, in a manner to be described in greater detail below, and creates thereby a similarity score. Based on the similarity score, block 110 filters out dissimilar documents (e.g., those documents having a similarity score that is below a similarity threshold), leaving a set of similar documents that are returned by block 112.

Figure 2:
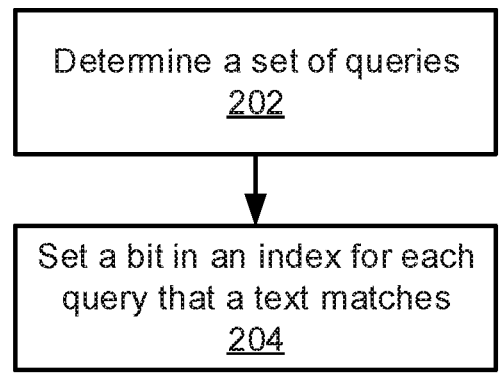
FIG. 2 is a block/flow diagram of a method for determining an index for a document that characterizes whether a set of queries matches the document in accordance with an embodiment of the present invention.

Referring now to FIG. 2, a method for creating an index for a document is shown. Block 202 determines a set of queries. Each query itself includes a set of terms and is expected to match a specified percentage of the documents in a database. It is specifically contemplated that the query may be a word or set of words, but it should be understood that other embodiments that use documents encoded as different kinds of data may use corresponding kinds of data in the queries.

In one specific embodiment, the query is expected to match about 50% of the documents in the database (where the presence of a single query term in a document is sufficient to match the query). In other embodiments the percentage may depend on the priority of the words in the query. For example, queries made up of more important words (e.g., words having an occurrence frequency in the middle of the range or content words) may be assigned a percentage lower than 50%.

To use one very specific example, consider the following words and their exemplary expected individual occurrences in a document:

"to": 30%
"clause": 20%
"factory": 15%
"pollution": 10%

In this example, if the "to" and "clause" patterns are not deemed to be important, a query that includes ("to", "clause") may be created to have a query with a matching probability of about 50%. However, if "factory" and "pollution" are deemed to be important, then a query may be created as ("factory", "pollution") with a match probability of about 25%. The lower the probability becomes, the more matches to these words will contribute to the similarity score calculated between two texts. In general, matching to queries having fewer words will indicate a higher likelihood that two documents that both match the same query will both share words.

Thus it is generally advantageous to use as few words as possible in the queries. In an ideal embodiment, every query will have only a single word. However, because it may be difficult to build a sufficient number of single-word queries that reach the desired match probability, a limited number of words may be combined. Thus, for example, an embodiment may have queries made up of four or fewer words. Using queries with low numbers of bits ensures that matching bits will be more meaningful.

The importance of words may be determined a priori by an expert with domain knowledge. Alternatively, importance may be determined automatically by, e.g., finding words having an occurrence frequency in the middle of the range, where the frequency of the words is neither too large (e.g., the word "the") nor too small. Such mid-frequency words are more likely to characterize the text.

Block 204 then sets a bit in an index for each query that a particular document matches. Each document will have its own associated index, including each document stored in the database as well as the new document being compared to the stored documents. Thus, if there are N queries (with an exemplary value of N being 32), the index will be an array of N bits, each bit corresponding to a respective query. Each query is compared to the document in question and, in the event that any word in the query matches a word in the document, a corresponding bit in the document's index is set to '1'. If no pattern in the document matches any pattern in the query, then the corresponding bit is set to '0'. This matching is performed for each query and the resulting index is stored.

It should be understood, as noted above, that the present embodiments also include non-textual documents and patterns. Thus, an image may be characterized by particular sets of pixels or by global image properties, an audio document may be characterized by particular sound patterns, and a generic binary document may be characterized by particular bit strings.

Figure 3:
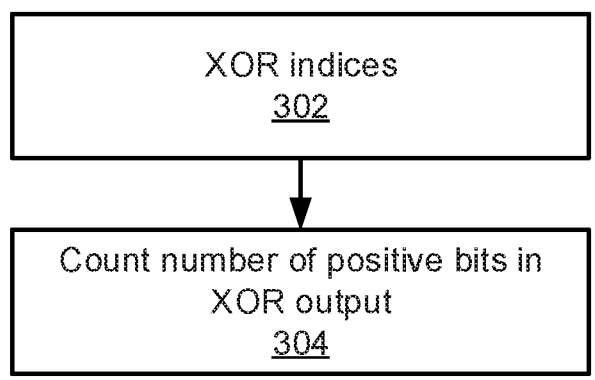
FIG. 3 is a block/flow diagram of a method for calculating a similarity score between documents based on respective indices for those documents in accordance with an embodiment of the present invention.

Referring now to FIG. 3, additional detail on how to compare two indices is shown. Given that an index of a document is an array of individual bits, each bit corresponding to a respective query, block 302 performs a bit-by-bit XOR of the arrays. The XOR operation takes two bits and returns a logical '1' if the bits differ or a logical '0' if the two bits are the same (known in the art as an "exclusive OR" operation).

Block 304 then counts the number of '1' bits in the XOR output for each pair of documents. This count represents one type of similarity score (or dissimilarity), where a higher value represents a greater number of mismatches. Thus, block 110 may filter out those documents that have a score that is higher than a threshold. Other forms of similarity score may use different operations to produce a score that characterizes the degree of similarity between two documents using their respective indices. Because an XOR will result in scores that obey a binomial distribution for unrelated documents, the scores for similar documents will be probabilistically distinguishable. In an alternative embodiment, a similarity score may be generated by setting a weight for each '1' bit in the XOR output according to the importance of the words in the query corresponding to the bit. For example, if a weight for a query, ("factory", "pollution"), is set to a value of 2.0, then a mismatch between two documents for this query will have twice as large an impact on the score than a mismatch between a query having a weight value of 1.0.

Thus consider, for example, the following three indices, each of which is formed from six queries:

| Query | Index 1 | Index 2 (related) | Index 3 (unrelated) |
|---|---|---|---|
| ("abolish", "mayor") | 1 | 1 | 0 |
| ("factory", "tax", "accident") | 1 | 0 | 1 |
| ("infraction", "plan") | 0 | 0 | 1 |
| ("river", "past", "drink", "regard") | 1 | 1 | 1 |
| ("determine") | 0 | 0 | 1 |
| ("water", "citizen", "tool") | 1 | 1 | 0 |

In this case, Index 1 represents an index for a new document, whereas Index 2 and Index 3 both represent stored indices for documents in the database. In this example, Index 2 characterizes a document that is related to the new document, while Index 3 characterizes an unrelated document. The comparison score between Index 1 and Index 2 will be 1 (because only for the query ("factory", "tax", "accident") do the two indices differ), whereas the comparison score between Index 1 and Index 3 will be 4.

As noted above, block 110 can use the resulting score to filter out dissimilar documents by, e.g., comparing the score to a threshold value. This threshold value is selected in accordance with an expected binomial distribution for unrelated documents, such that most unrelated documents will have a score greater than the threshold. Because of the way the XOR function described above operates, the score actually measures dissimilarity, but other comparison functions may instead produce scores that measure true similarity and, thus, dissimilar documents would have scores falling below a threshold. Block 112 thus returns a list of documents—those documents which survived the filter of block 110—based on how similar the returned documents are to an input document. This provides the ability of a user to quickly search a large body of documents for anything that is similar to a provided exemplar.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
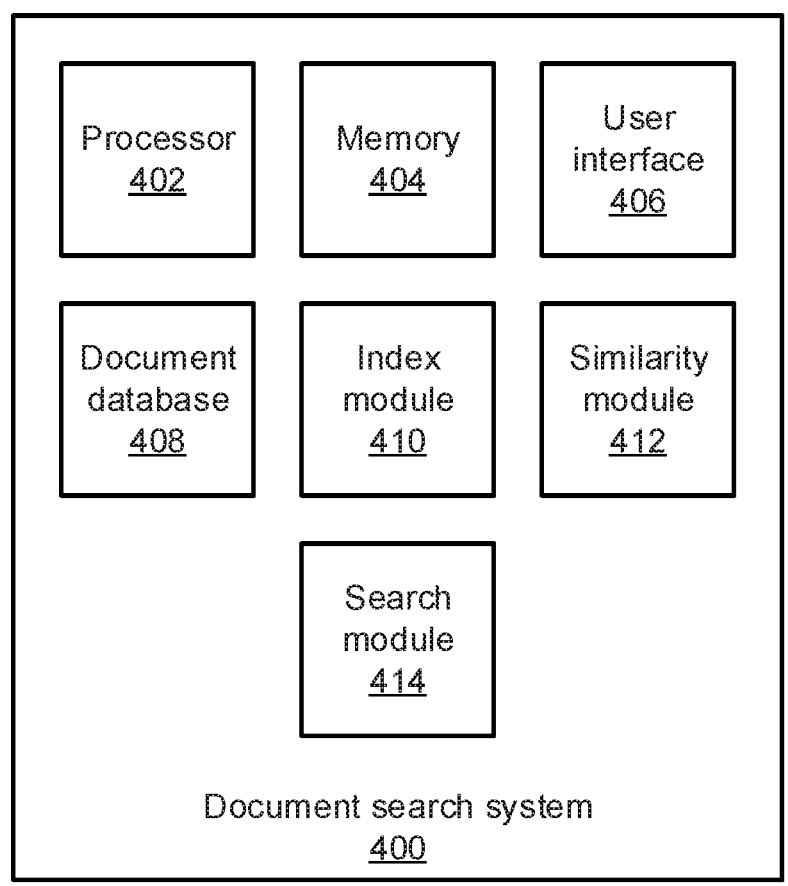
FIG. 4 is a block diagram of a document search system that searches for documents that are similar to a given input document in accordance with an embodiment of the present invention.

Referring now to FIG. 4, a document search system 400 is shown. The system 400 includes a hardware processor 402 and memory 404, as well as a user interface 406. In some embodiments the user interface 406 may be housed in a separate physical device that communicates with the document search system 400 via an appropriate communications protocol with appropriate hardware interfaces. The system 400 also includes one or more functional modules that may, in some embodiments, be implemented as software that is stored in the memory 404 and that is executed by processor 402. In other embodiments, the functional modules may be implemented as one or more discrete hardware components in the form of, e.g., application-specific integrated chips or field programmable gate arrays.

A document database 408 is stored in the memory 404. In one specific embodiment the document database 408 may store text documents that reflect, e.g., the laws, ordinances, and provisions of a particular municipality or of a set of municipalities. Each document in the document database 408 is stored with the full data of that document as well as with an index of the document as described above. An index module 410 is used to generate said indices based on a set of queries, with the queries being statically defined in advance or being defined in whole or in part through the input of a user.

A search module 414 coordinates with the user interface 406 to accept search requests. A search request may include an input document or may, alternatively, indicate a document that is already stored in the document database 408. In the former case, the search module 414 triggers index module 410 to generate a new index for the input document. In the latter case, the search module 414 accesses the index of the indicated document from the document database 408. The search module 414 then triggers similarity module 412 to compare the new index to the index of every document in the document database 408. Search module 414 compares the resulting similarity scores to a threshold and filters out dissimilar documents. User interface 406 then provides a list of remaining (i.e., similar) documents to the requesting user.

Figure 5:
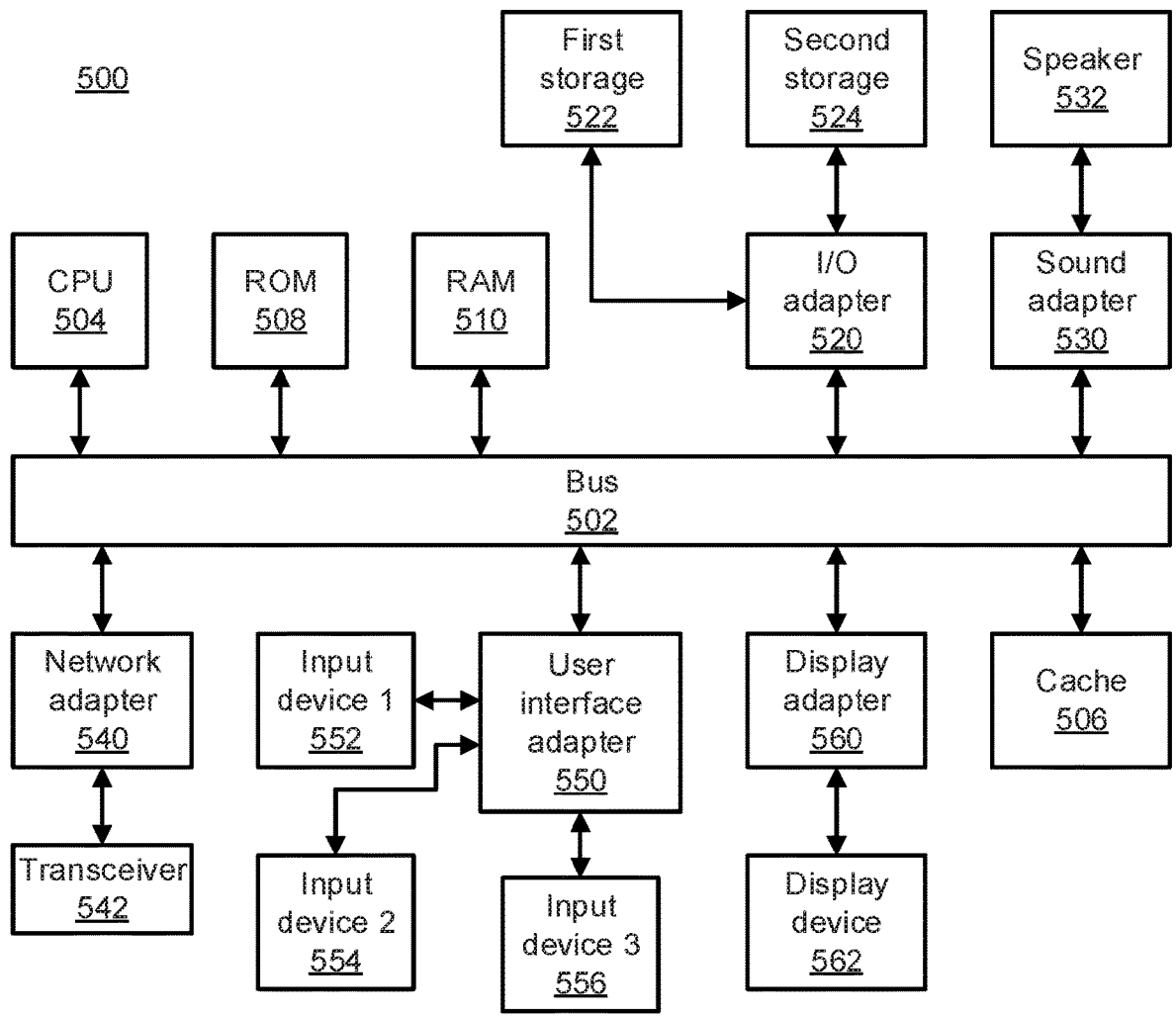
FIG. 5 is a block diagram of a processing system in accordance with an embodiment of the present invention.

Referring now to FIG. 5, an exemplary processing system 500 is shown which may represent the document search system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments of fast filtering for similarity searches on indexed data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for searching for similar documents, comprising:
generating an input index for a requested document, based on a plurality of queries, each query including one or more text strings, wherein the input index records which queries have at least one text string from the one or more text strings that is present in the input document, wherein the one or more text strings of each of the plurality of queries have a summed probability of matching 50% or fewer of the stored documents;
comparing the input index of the requested document to one or more stored indices for respective stored documents, to produce a similarity score for each of the stored documents;
filtering the stored documents to remove dissimilar documents from a list of the stored documents based on a comparison of each respective similarity score to a threshold; and
outputting the list of any stored documents that remain after said filtering.

2. The method of claim 1, further comprising generating a respective stored index for each of the stored documents based on the plurality of queries.

3. The method of claim 1, wherein comparing the input index to the one or more stored indices comprises performing an XOR operation between the input index and each stored index.

4. The method of claim 3, wherein comparing the input index to the one or more stored indices further comprises counting a number of '1' bits in an output of each XOR operation to produce the similarity score for each of the stored documents.

5. The method of claim 4, wherein filtering the stored documents comprises removing documents having a similarity score above the threshold.

6. The method of claim 1, wherein the queries comprise text strings selected from a predetermined text string collection.

7. A non-transitory computer readable storage medium comprising a computer readable program for searching for similar documents, wherein the computer readable program when executed on a computer causes the computer to perform the steps of:
generating an input index for a requested document, based on a plurality of queries, each query including one or more text strings, wherein the input index records which queries have at least one text string from the one or more text strings that is present in the input document, wherein the one or more text strings of each of the plurality of queries have a summed probability of matching 50% or fewer of the stored documents;
comparing the input index of the requested document to one or more stored indices for respective stored documents, to produce a similarity score for each of the stored documents;
filtering the stored documents to remove dissimilar documents from a list of the stored documents based on a comparison of each respective similarity score to a threshold; and
outputting the list of any stored documents that remain after said filtering.

8. A system for searching for similar documents, comprising:
a user interface configured to receive a requested document and to display similar documents;
an index module configured to generate an input index for the requested document based on a plurality of queries, each query including one or more text strings, wherein the input index records which queries have at least one text string from the one or more text strings that is present in the input document, wherein the one or more text strings of each of the plurality of queries have a summed probability of matching 50% or fewer of the stored documents;
a database configured to store a plurality of documents and a respective index for each stored document, each index indicating which of a plurality of queries matched a respective document;
a similarity module comprising a processor configured to compare an input index of the requested document to one or more stored indices for respective stored documents; and
a search module configured to filter the stored documents to remove dissimilar documents from a list of the stored documents based on a comparison of each respective similarity score to a threshold and to output the list of any stored documents that remain after said filtering for display as the similar documents.

9. The system of claim 8, wherein the index module is further configured to generate a respective stored index for each of the stored documents based on the plurality of queries.

10. The system of claim 8, wherein the similarity module is further configured to compare the input index to the one or more stored indices comprises performing an XOR operation between the input index and each stored index.

11. The system of claim 10, wherein the similarity module is further configured to compare the input index to the one or more stored indices further comprises counting a number of '1' bits in an output of each XOR operation to produce the similarity score for each of the stored documents.

12. The system of claim 11, wherein the search module is further configured to remove documents having a similarity score above the threshold.

13. The system of claim 8, wherein the queries comprise text strings selected from a predetermined text string collection.

* * * * *